(12) United States Patent
Miwa

(10) Patent No.: US 10,389,919 B2
(45) Date of Patent: Aug. 20, 2019

(54) IMAGE FORMING APPARATUS, IMAGE FORMING SYSTEM, AND CALIBRATION METHOD

(71) Applicant: Ryotaro Miwa, Kanagawa (JP)

(72) Inventor: Ryotaro Miwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/920,640

(22) Filed: Mar. 14, 2018

(65) Prior Publication Data

US 2018/0278807 A1 Sep. 27, 2018

(30) Foreign Application Priority Data

Mar. 21, 2017 (JP) ................. 2017-055140

(51) Int. Cl.
*H04N 1/60* (2006.01)
*H04N 1/00* (2006.01)
(Continued)

(52) U.S. Cl.
CPC ....... *H04N 1/6044* (2013.01); *G03G 15/5062* (2013.01); *H04N 1/00045* (2013.01); *H04N 1/00087* (2013.01); *H04N 1/6019* (2013.01); *H04N 1/6027* (2013.01); *H04N 1/6094* (2013.01); *H04N 1/6097* (2013.01);
(Continued)

(58) Field of Classification Search
CPC .. H04N 1/6044; H04N 1/6097; H04N 1/6094; H04N 1/00087; H04N 1/00045; H04N 1/6027; H04N 1/6019; H04N 1/00061; H04N 1/00063; H04N 1/00323; H04N 1/6008; H04N 1/6033; G03G 15/5062; G03G 15/5087; G03G 15/503; G03G 15/0105; G03G 2215/00067; G01J 2003/503; G01J 3/50

See application file for complete search history.

(56) References Cited

U.S. PATENT DOCUMENTS

| | | | |
|---|---|---|---|
| 8,736,904 B2 * | 5/2014 | Miyazaki | H04N 1/6033 347/104 |
| 9,332,159 B2 * | 5/2016 | Sakatani | H04N 1/6052 |
| 9,979,860 B2 * | 5/2018 | Yamaguchi | H04N 1/00323 |

FOREIGN PATENT DOCUMENTS

| | | |
|---|---|---|
| JP | 2003-283732 | 10/2003 |
| JP | 2008-131618 | 6/2008 |
| JP | 2012-242467 | 12/2012 |

* cited by examiner

*Primary Examiner* — Kent Yip
(74) *Attorney, Agent, or Firm* — Oblon, McClelland, Maier & Neustadt, L.L.P.

(57) ABSTRACT

An image forming apparatus includes an image forming section to form a correction pattern, a reading unit to read the pattern and generate first data, a color converter to convert the first data into second data, a memory to store density conversion data for a recording medium, a determiner to determine whether the memory contains the conversion data for the recording medium the pattern is formed, an acquisition unit to acquire spectral measured by an external colorimeter when the memory does not contain the conversion data, a first density converter to convert the spectral data into density data, a density conversion data generator to correlate the second data and the density data and generate the conversion data, a second density converter to convert the second data into the density data using the conversion data, and a correction curve generator to generate correction curve data based on the density data.

10 Claims, 21 Drawing Sheets

(51) Int. Cl.
   *G03G 15/00*   (2006.01)
   *G03G 15/01*   (2006.01)
   *G01J 3/50*    (2006.01)
(52) U.S. Cl.
   CPC ........... *G01J 3/50* (2013.01); *G01J 2003/503* (2013.01); *G03G 15/0105* (2013.01); *G03G 15/5087* (2013.01); *G03G 2215/00067* (2013.01)

FIG. 12

| VALUE OF IMAGE DENSITY CONVERSION TABLE | INPUT: RGBY DATA | OUTPUT CMYK DATA |
|---|---|---|
| R-C CONVERSION (4096 GRADATION) | R DATA | MEASURED COLOR DATA: C |
| G-M CONVERSION (4096 GRADATION) | G DATA | MEASURED COLOR DATA: M |
| B-Y CONVERSION (4096 GRADATION) | B DATA | MEASURED COLOR DATA: Y |
| Y-K CONVERSION (4096 GRADATION) | Y DATA | MEASURED COLOR DATA: K |

FIG. 13

| FIG. 13A | FIG. 13B |
|---|---|
| FIG. 13C | FIG. 13D |
| FIG. 13E | FIG. 13F |
| FIG. 13G | FIG. 13H |

FIG. 13A

| | | | | ROW | VALUE READ OUT FROM SENSOR | | | MEASURED COLOR DATA | | |
|---|---|---|---|---|---|---|---|---|---|---|
| P | COLUMN | | Key | NUM-BER | GRADA-TION VALUE (%) | VALUE READ OUT FROM SENSOR | | NUM-BER | GRADA-TION VALUE (%) | MEASURED COLOR DATA |
| 1 | A | 1 | 1A1 | C-1 | 0 | 3000 | | C-1 | 0 | 0.06 |
| 1 | A | 2 | 1A2 | C-2 | 5 | 2900 | | C-2 | 5 | 0.07 |
| 1 | A | 3 | 1A3 | C-3 | 10 | 2800 | | C-3 | 10 | 0.07 |
| 1 | A | 4 | 1A4 | C-4 | 15 | 2700 | | C-4 | 15 | 0.08 |
| 1 | A | 5 | 1A5 | C-5 | 20 | 2600 | | M-4 | 15 | 0.08 |
| 1 | A | 6 | 1A6 | C-6 | 25 | 2500 | | M-5 | 20 | 0.09 |
| 1 | A | 7 | 1A7 | C-7 | 30 | 2400 | | M-6 | 25 | 0.1 |
| 1 | A | 8 | 1A8 | C-8 | 35 | 2300 | | M-7 | 30 | 0.11 |
| 1 | A | 9 | 1A9 | C-9 | 40 | 2200 | | C-5 | 20 | 0.09 |
| 1 | A | 10 | 1A10 | C-10 | 45 | 2100 | | C-6 | 25 | 0.1 |
| 1 | E | 8 | 1E8 | K-9 | 40 | 2500 | | C-7 | 30 | 0.11 |
| 1 | E | 9 | 1E9 | K-10 | 45 | 2500 | | C-8 | 35 | 0.13 |
| 1 | E | 10 | 1E10 | K-11 | 50 | 2000 | | Y-4 | 15 | 0.1 |
| 1 | E | 11 | 1E11 | K-12 | 55 | 2000 | | Y-5 | 20 | 0.1 |
| 1 | B | 16 | 1B16 | C-17 | 80 | 1000 | | Y-6 | 25 | 0.11 |

FIG. 13B

LINKED RESULT AFTER SORT

| P | COLUMN | ROW | Key | NUMBER | GRADATION VALUE (%) | VALUE READ OUT FROM SENSOR | MEASURED COLOR DATA |
|---|---|---|---|---|---|---|---|
| 1 | A | 1 | 1A1 | C-1 | 0 | 3000 | 0.06 |
| 1 | A | 2 | 1A2 | C-2 | 5 | 2900 | 0.07 |
| 1 | A | 3 | 1A3 | C-3 | 10 | 2800 | 0.07 |
| 1 | A | 4 | 1A4 | C-4 | 15 | 2700 | 0.08 |
| 1 | A | 5 | 1A5 | C-5 | 20 | 2600 | 0.09 |
| 1 | A | 6 | 1A6 | C-6 | 25 | 2500 | 0.1 |
| 1 | A | 7 | 1A7 | C-7 | 30 | 2400 | 0.11 |
| 1 | A | 8 | 1A8 | C-8 | 35 | 2300 | 0.13 |
| 1 | A | 9 | 1A9 | C-9 | 40 | 2200 | 0.18 |
| 1 | A | 10 | 1A10 | C-10 | 45 | 2100 | 0.24 |
| 1 | A | 11 | 1A11 | C-11 | 50 | 2000 | 0.27 |
| 1 | A | 12 | 1A12 | C-12 | 55 | 1900 | 0.3 |
| 1 | A | 13 | 1A13 | C-13 | 60 | 1800 | 0.33 |
| 1 | A | 14 | 1A14 | C-14 | 65 | 1700 | 0.39 |
| 1 | A | 15 | 1A15 | C-15 | 70 | 1600 | 0.46 |

FIG. 13C

| | | | | | | | |
|---|---|---|---|---|---|---|---|
| 1B | 15 | 1B15 | G-18 | 85 | 1000 | Y-7 | 30 | 0.13 |
| 1B | 14 | 1B14 | G-19 | 90 | 1000 | C-9 | 40 | 0.18 |
| 1B | 13 | 1B13 | G-20 | 95 | 1000 | C-10 | 45 | 0.24 |
| 1B | 12 | 1B12 | C-21 | 100 | 500 | C-11 | 50 | 0.27 |
| 1B | 11 | 1B11 | M-1 | 0 | 3000 | C-12 | 55 | 0.3 |
| 1B | 10 | 1B10 | M-2 | 5 | 3000 | K-4 | 15 | 0.07 |
| 1B | 9 | 1B9 | M-3 | 10 | 3000 | K-5 | 20 | 0.08 |
| 1B | 8 | 1B8 | M-4 | 15 | 3000 | K-6 | 25 | 0.09 |
| 1B | 7 | 1B7 | M-5 | 20 | 3000 | K-7 | 30 | 0.11 |
| 1A | 11 | 1A11 | C-11 | 50 | 2000 | C-13 | 60 | 0.33 |
| 1A | 12 | 1A12 | C-12 | 55 | 1900 | C-14 | 65 | 0.39 |
| 1A | 13 | 1A13 | C-13 | 60 | 1800 | C-15 | 70 | 0.46 |
| 1A | 14 | 1A14 | C-14 | 65 | 1700 | C-16 | 75 | 0.53 |
| 1A | 15 | 1A15 | C-15 | 70 | 1600 | C-21 | 100 | 1.59 |
| 1A | 16 | 1A16 | C-16 | 75 | 1500 | M-1 | 0 | 0.07 |
| 1B | 6 | 1B6 | M-6 | 25 | 2500 | M-2 | 5 | 0.07 |
| 1B | 5 | 1B5 | M-7 | 30 | 2500 | M-3 | 10 | 0.08 |
| 1B | 4 | 1B4 | M-8 | 35 | 2500 | Y-8 | 35 | 0.14 |
| 1B | 3 | 1B3 | M-9 | 40 | 2500 | Y-9 | 40 | 0.17 |
| 1B | 2 | 1B2 | M-10 | 45 | 2500 | Y-10 | 45 | 0.22 |
| 1B | 1 | 1B1 | M-11 | 50 | 2000 | Y-11 | 50 | 0.27 |
| 1C | 1 | 1C1 | M-12 | 55 | 2000 | M-8 | 35 | 0.13 |
| 1C | 2 | 1C2 | M-13 | 60 | 2000 | M-9 | 40 | 0.16 |
| 1C | 3 | 1C3 | M-14 | 65 | 2000 | M-10 | 45 | 0.2 |

FIG. 13D

| | | | | | |
|---|---|---|---|---|---|
| 1A | 16 | 1A16 | C-16 | 75 | 1500 | 0.53 |
| 1B | 16 | 1B16 | C-17 | 80 | 1000 | 0.59 |
| 1B | 15 | 1B15 | C-18 | 85 | 1000 | 0.69 |
| 1B | 14 | 1B14 | C-19 | 90 | 1000 | 0.85 |
| 1B | 13 | 1B13 | C-20 | 95 | 1000 | 1.1 |
| 1B | 12 | 1B12 | C-21 | 100 | 500 | 1.59 |
| 1B | 11 | 1B11 | M-1 | 0 | 3000 | 0.07 |
| 1B | 10 | 1B10 | M-2 | 5 | 3000 | 0.07 |
| 1B | 9 | 1B9 | M-3 | 10 | 3000 | 0.08 |
| 1B | 8 | 1B8 | M-4 | 15 | 3000 | 0.08 |
| 1B | 7 | 1B7 | M-5 | 20 | 3000 | 0.09 |
| 1B | 6 | 1B6 | M-6 | 25 | 2500 | 0.1 |
| 1B | 5 | 1B5 | M-7 | 30 | 2500 | 0.11 |
| 1B | 4 | 1B4 | M-8 | 35 | 2500 | 0.13 |
| 1B | 3 | 1B3 | M-9 | 40 | 2500 | 0.16 |
| 1B | 2 | 1B2 | M-10 | 45 | 2500 | 0.2 |
| 1B | 1 | 1B1 | M-11 | 50 | 2000 | 0.24 |
| 1C | 1 | 1C1 | M-12 | 55 | 2000 | 0.27 |
| 1C | 2 | 1C2 | M-13 | 60 | 2000 | 0.32 |
| 1C | 3 | 1C3 | M-14 | 65 | 2000 | 0.37 |
| 1C | 4 | 1C4 | M-15 | 70 | 2000 | 0.42 |
| 1C | 5 | 1C5 | M-16 | 75 | 2000 | 0.47 |
| 1C | 6 | 1C6 | M-17 | 80 | 500 | 0.54 |
| 1C | 7 | 1C7 | M-18 | 85 | 500 | 0.64 |

FIG. 13E

| | | | | | | | | | |
|---|---|---|---|---|---|---|---|---|---|
| 1D | 10 | 1D10 | Y-13 | 60 | 2000 | M-11 | 50 | 0.24 |
| 1D | 9 | 1D9 | Y-14 | 65 | 2000 | K-8 | 35 | 0.13 |
| 1D | 8 | 1D8 | Y-15 | 70 | 2000 | K-9 | 40 | 0.17 |
| 1D | 7 | 1D7 | Y-16 | 75 | 2000 | K-10 | 45 | 0.2 |
| 1D | 6 | 1D6 | Y-17 | 80 | 500 | K-11 | 50 | 0.24 |
| 1D | 5 | 1D5 | Y-18 | 85 | 500 | M-12 | 55 | 0.27 |
| 1C | 4 | 1C4 | M-15 | 70 | 2000 | M-13 | 60 | 0.32 |
| 1C | 5 | 1C5 | M-16 | 75 | 2000 | M-14 | 65 | 0.37 |
| 1C | 6 | 1C6 | M-17 | 80 | 500 | M-15 | 70 | 0.42 |
| 1C | 7 | 1C7 | M-18 | 85 | 500 | M-16 | 75 | 0.47 |
| 1C | 8 | 1C8 | M-19 | 90 | 500 | C-17 | 80 | 0.59 |
| 1C | 9 | 1C9 | M-20 | 95 | 500 | C-18 | 85 | 0.69 |
| 1C | 10 | 1C10 | M-21 | 100 | 500 | C-19 | 90 | 0.85 |
| 1C | 11 | 1C11 | Y-1 | 0 | 3000 | C-20 | 95 | 1.1 |
| 1C | 12 | 1C12 | Y-2 | 5 | 3000 | M-21 | 100 | 1.4 |
| 1C | 13 | 1C13 | Y-3 | 10 | 3000 | Y-1 | 0 | 0.08 |
| 1C | 14 | 1C14 | Y-4 | 15 | 3000 | Y-2 | 5 | 0.08 |
| 1C | 15 | 1C15 | Y-5 | 20 | 3000 | Y-3 | 10 | 0.09 |
| 1C | 16 | 1C16 | Y-6 | 25 | 2500 | K-12 | 55 | 0.31 |
| 1D | 16 | 1D16 | Y-7 | 30 | 2500 | K-13 | 60 | 0.36 |
| 1D | 15 | 1D15 | Y-8 | 35 | 2500 | K-14 | 65 | 0.42 |
| 1D | 14 | 1D14 | Y-9 | 40 | 2500 | K-15 | 70 | 0.48 |
| 1D | 13 | 1D13 | Y-10 | 45 | 2500 | Y-12 | 55 | 0.31 |
| 1D | 12 | 1D12 | Y-11 | 50 | 2000 | Y-13 | 60 | 0.34 |

FIG. 13F

| | | | | | |
|---|---|---|---|---|---|
| 1C | 8 | 1C8 | M-19 | 90 | 500 | 0.77 |
| 1C | 9 | 1C9 | M-20 | 95 | 500 | 0.99 |
| 1C | 10 | 1C10 | M-21 | 100 | 500 | 1.4 |
| 1C | 11 | 1C11 | Y-1 | 0 | 3000 | 0.08 |
| 1C | 12 | 1C12 | Y-2 | 5 | 3000 | 0.08 |
| 1C | 13 | 1C13 | Y-3 | 10 | 3000 | 0.09 |
| 1C | 14 | 1C14 | Y-4 | 15 | 3000 | 0.1 |
| 1C | 15 | 1C15 | Y-5 | 20 | 3000 | 0.1 |
| 1C | 16 | 1C16 | Y-6 | 25 | 2500 | 0.11 |
| 1D | 16 | 1D16 | Y-7 | 30 | 2500 | 0.13 |
| 1D | 15 | 1D15 | Y-8 | 35 | 2500 | 0.14 |
| 1D | 14 | 1D14 | Y-9 | 40 | 2500 | 0.17 |
| 1D | 13 | 1D13 | Y-10 | 45 | 2500 | 0.22 |
| 1D | 12 | 1D12 | Y-11 | 50 | 2000 | 0.27 |
| 1D | 11 | 1D11 | Y-12 | 55 | 2000 | 0.31 |
| 1D | 10 | 1D10 | Y-13 | 60 | 2000 | 0.34 |
| 1D | 9 | 1D9 | Y-14 | 65 | 2000 | 0.38 |
| 1D | 8 | 1D8 | Y-15 | 70 | 2000 | 0.43 |
| 1D | 7 | 1D7 | Y-16 | 75 | 2000 | 0.47 |
| 1D | 6 | 1D6 | Y-17 | 80 | 500 | 0.53 |
| 1D | 5 | 1D5 | Y-18 | 85 | 500 | 0.61 |
| 1D | 4 | 1D4 | Y-19 | 90 | 500 | 0.71 |
| 1D | 3 | 1D3 | Y-20 | 95 | 500 | 0.84 |
| 1D | 2 | 1D2 | Y-21 | 100 | 500 | 1 |

FIG. 13G

| | | | | | | | | |
|---|---|---|---|---|---|---|---|---|
| 1D | 11 | 1D11 | Y-12 | 55 | 2000 | Y-14 | 65 | 0.38 |
| 1E | 12 | 1E12 | K-13 | 60 | 2000 | Y-15 | 70 | 0.43 |
| 1E | 13 | 1E13 | K-14 | 65 | 2000 | Y-16 | 75 | 0.47 |
| 1E | 14 | 1E14 | K-15 | 70 | 2000 | Y-17 | 80 | 0.53 |
| 1E | 15 | 1E15 | K-16 | 75 | 2000 | Y-18 | 85 | 0.61 |
| 1E | 16 | 1E16 | K-17 | 80 | 500 | Y-19 | 90 | 0.71 |
| 1F | 16 | 1F16 | K-18 | 85 | 500 | Y-20 | 95 | 0.84 |
| 1D | 4 | 1D4 | Y-19 | 90 | 500 | M-17 | 80 | 0.54 |
| 1D | 3 | 1D3 | Y-20 | 95 | 500 | M-18 | 85 | 0.64 |
| 1D | 2 | 1D2 | Y-21 | 100 | 500 | M-19 | 90 | 0.77 |
| 1D | 1 | 1D1 | K-1 | 0 | 3000 | M-20 | 95 | 0.99 |
| 1E | 1 | 1E1 | K-2 | 5 | 3000 | Y-21 | 100 | 1 |
| 1E | 2 | 1E2 | K-3 | 10 | 3000 | K-1 | 0 | 0.07 |
| 1E | 3 | 1E3 | K-4 | 15 | 3000 | K-2 | 5 | 0.07 |
| 1E | 4 | 1E4 | K-5 | 20 | 3000 | K-3 | 10 | 0.07 |
| 1E | 5 | 1E5 | K-6 | 25 | 2500 | K-16 | 75 | 0.55 |
| 1E | 6 | 1E6 | K-7 | 30 | 2500 | K-17 | 80 | 0.62 |
| 1E | 7 | 1E7 | K-8 | 35 | 2500 | K-18 | 85 | 0.78 |
| 1F | 15 | 1F15 | K-19 | 90 | 500 | K-19 | 90 | 1.01 |
| 1F | 14 | 1F14 | K-20 | 95 | 500 | K-20 | 95 | 1.28 |
| 1F | 13 | 1F13 | K-21 | 100 | 500 | K-21 | 100 | 1.9 |

FIG. 13H

| | | | | | |
|---|---|---|---|---|---|
| 1D | 1 | 1D1 | K-1 | 0 | 3000 | 0.07 |
| 1E | 1 | 1E1 | K-2 | 5 | 3000 | 0.07 |
| 1E | 2 | 1E2 | K-3 | 10 | 3000 | 0.07 |
| 1E | 3 | 1E3 | K-4 | 15 | 3000 | 0.07 |
| 1E | 4 | 1E4 | K-5 | 20 | 3000 | 0.08 |
| 1E | 5 | 1E5 | K-6 | 25 | 2500 | 0.09 |
| 1E | 6 | 1E6 | K-7 | 30 | 2500 | 0.11 |
| 1E | 7 | 1E7 | K-8 | 35 | 2500 | 0.13 |
| 1E | 8 | 1E8 | K-9 | 40 | 2500 | 0.17 |
| 1E | 9 | 1E9 | K-10 | 45 | 2500 | 0.2 |
| 1E | 10 | 1E10 | K-11 | 50 | 2000 | 0.24 |
| 1E | 11 | 1E11 | K-12 | 55 | 2000 | 0.31 |
| 1E | 12 | 1E12 | K-13 | 60 | 2000 | 0.36 |
| 1E | 13 | 1E13 | K-14 | 65 | 2000 | 0.42 |
| 1E | 14 | 1E14 | K-15 | 70 | 2000 | 0.48 |
| 1E | 15 | 1E15 | K-16 | 75 | 2000 | 0.55 |
| 1E | 16 | 1E16 | K-17 | 80 | 500 | 0.62 |
| 1F | 16 | 1F16 | K-18 | 85 | 500 | 0.78 |
| 1F | 15 | 1F15 | K-19 | 90 | 500 | 1.01 |
| 1F | 14 | 1F14 | K-20 | 95 | 500 | 1.28 |
| 1F | 13 | 1F13 | K-21 | 100 | 500 | 1.9 |

IMAGE FORMING APPARATUS, IMAGE FORMING SYSTEM, AND CALIBRATION METHOD

CROSS-REFERENCE TO RELATED APPLICATION

This patent application is based on and claims priority pursuant to 35 U.S.C. § 119 to Japanese Patent Applications No. 2017-055140, filed on Mar. 21, 2017 in the Japanese Patent Office, the entire disclosure of which is hereby incorporated by reference herein.

BACKGROUND

Technical Field

The present disclosure relates to an image forming apparatus, an image forming system, and a calibration method.

Background Art

Conventionally, an image forming apparatus uses a technique called calibration to maintain constant gradation characteristics that are apt to change due to environmental change and changes in device characteristics. Types of calibration include manual calibration and automatic calibration.

In manual calibration, the user manually measures image densities of an image density correction pattern generated by the image forming apparatus using the external colorimetric device. The measured image densities are converted into image density data. Based on the converted image density data, a correction curve is generated. The image forming apparatus corrects the gradation of the image to be printed using the generated correction curve.

In automatic calibration, the image forming apparatus generates the image density correction pattern, automatically reads the image densities of the image density correction pattern using an in-line sensor set in the image forming apparatus, converts the read image densities into image density data using the image density conversion data, generates a correction curve based on the converted image density data, and corrects the gradation of the image to be printed using the generated correction curve.

Generally, an image forming apparatus used for printing that requires color stability or high definition, such as commercial printing, tends to require more frequent calibration to maintain color stability, which results in a short execution interval. Therefore, such an image forming apparatus often adopts automatic calibration, which can shorten person-hours in comparison with manual calibration in many cases.

SUMMARY

This specification describes an improved image forming apparatus. In one illustrative embodiment, the image forming apparatus includes an image forming section, a reading unit, a color converter, an image density conversion data memory, a determiner, an acquisition unit, a first image density converter, an image density conversion data generator, a second image density converter, and a correction curve generator.

The image forming section forms an image density correction pattern on a recording medium. The reading unit reads the image density correction pattern formed on the recording medium and generates first color data. The color converter converts the first color data into second color data. The image density conversion data memory stores image density conversion data for multiple types of the recording medium. The determiner determines whether the image density conversion data memory contains the image density conversion data for the type of the recording medium on which the image density correction pattern is formed. The acquisition unit acquires spectral data that is a colorimetric result of the image density correction pattern measured by an external colorimeter when the determiner determines that the image density conversion data memory does not contain the image density conversion data for the type of the recording medium on which the image density correction pattern is formed. The first image density converter converts the spectral data into image density data. The image density conversion data generator correlates the second color data and the image density data and generates the image density conversion data for the type of the recording medium on which the image density correction pattern is formed. The second image density converter converts the second color data into the image density data using the image density conversion data generated by the image density conversion data generator. The correction curve generator generates correction curve data based on the image density data.

This specification further describes an improved image forming system. In one illustrative embodiment, the image forming system includes an image forming section, a reading unit, a color converter, an image density conversion data memory, a determiner, an acquisition unit, a first image density converter, an image density conversion data generator, a second image density converter, and a correction curve generator.

The image forming section forms an image density correction pattern on a recording medium. The reading unit reads the image density correction pattern formed on the recording medium and generates first color data. The color converter converts the first color data into second color data. The image density conversion data memory stores image density conversion data for multiple types of the recording medium. The determiner determines whether the image density conversion data memory contains the image density conversion data for the type of the recording medium on which the image density correction pattern is formed. The acquisition unit acquires spectral data that is a colorimetric result of the image density correction pattern measured by an external colorimeter when the determiner determines that the image density conversion data memory does not contain the image density conversion data for the type of the recording medium on which the image density correction pattern is formed. The first image density converter converts the spectral data into image density data. The image density conversion data generator correlates the second color data and the image density data and generates the image density conversion data for the type of the recording medium on which the image density correction pattern is formed. The second image density converter converts the second color data into the image density data using the image density conversion data generated by the image density conversion data generator. The correction curve generator generates correction curve data based on the image density data.

This specification still further describes an improved calibration method. In one illustrative embodiment, the calibration method includes forming an image density correction pattern on a recording medium, reading the image density correction pattern formed on the recording medium and generating first color data, converting the first color data into second color data, determining whether the image density conversion data for the type of the recording medium on which the image density correction pattern is formed is stored in a memory, acquiring spectral data that is a colorimetric result of the image density correction pattern measured by an external colorimeter when the image density conversion data for the type of the recording medium on which the image density correction pattern is formed is not stored in the memory, converting the spectral data into image density data, correlating the second color data and the image density data; generating the image density conversion data for the type of the recording medium on which the image density correction pattern is formed, converting the second color data into the image density data using the generated image density conversion data, and generating correction curve data based on the image density data.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 12 is a table illustrating an example of an outlined correspondence between data of red, green, blue, and yellow (hereinafter called as RGBY data) and data of cyan, magenta, yellow, and black (hereinafter called as CMYK data) in the image density conversion data according to the present embodiment;

FIGS. 13A to 13H (collectively referred to as FIG. 13) are divisions of a table illustrating an example of a detailed correspondence between RGBY data and CMYK data in the image density conversion data according to the present embodiment;

Figure 1:
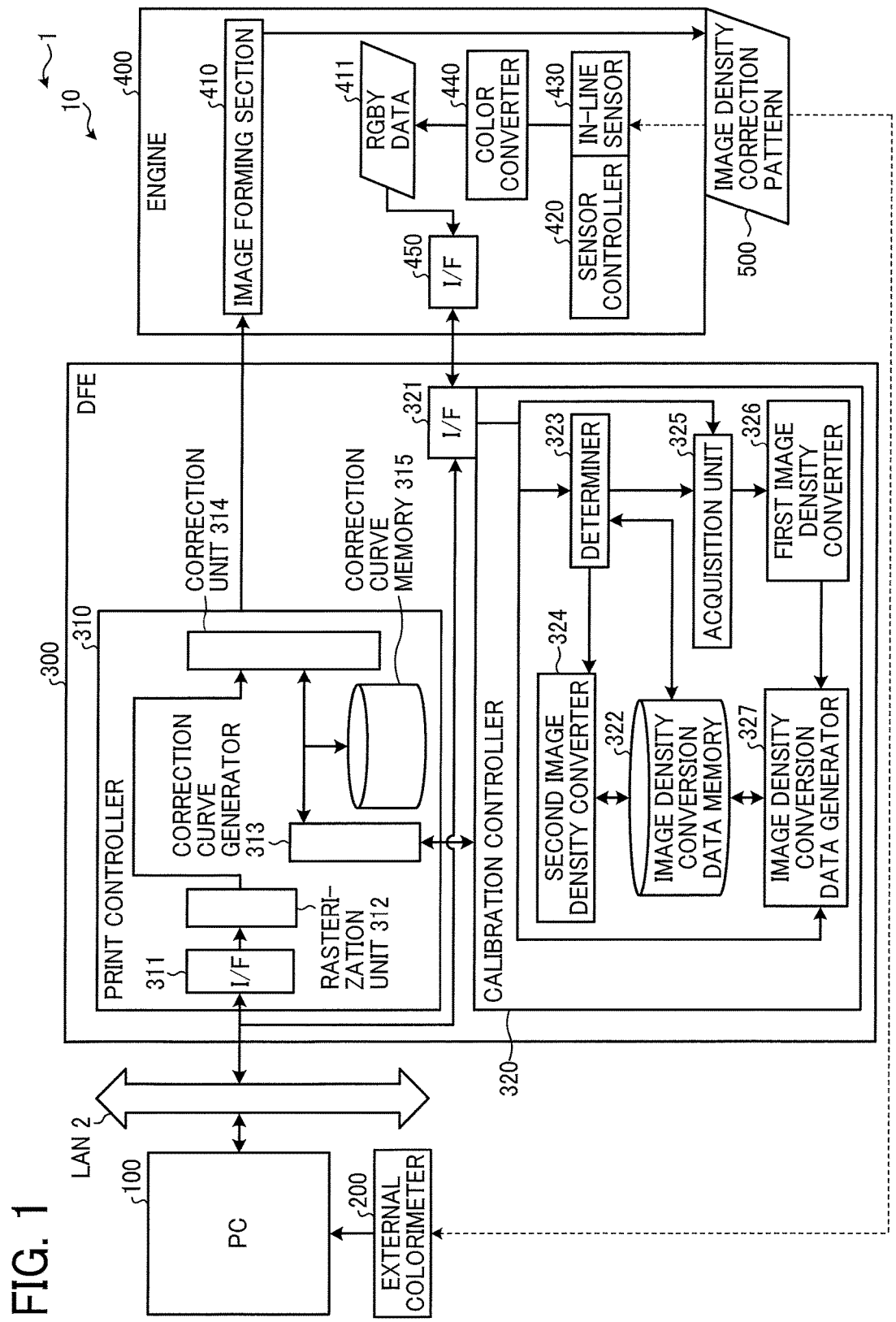
FIG. 1 is a block diagram illustrating a configuration example of an image forming system according to the present embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a block diagram illustrating a configuration example of an image forming system according to the present embodiment. As illustrated in FIG. 1, the image forming system 1 includes an image forming apparatus 10, a personal computer (PC) 100, and an external colorimeter 200.

The image forming apparatus 10 and the PC 100 are connected by a local area network (LAN) 2, and the external colorimeter 200 is directly connected to the PC 100. However, the connection form of the image forming apparatus, the PC 100, and the external colorimeter 200 is not limited to this, and these elements may be connected by any other arbitrary network configuration.

The external colorimeter 200 is a device to measure a colorimetric value of an image density correction pattern. A user uses the external colorimeter 200 and manually measures the colorimetric value of the image density correction pattern. The PC 100 acquires spectral data as the colorimetric result of the image density correction pattern from the external colorimeter 200 and transmits the spectral data to the image forming apparatus 10 or transmits the print data including the image to be printed to the image forming apparatus 10.

The image forming apparatus 10 executes printing based on the print data transmitted from the PC 100 or calibration. In the present embodiment, the case where the image forming apparatus 10 is a printing apparatus is described as an example, but the present disclosure is not limited to this.

The image forming apparatus 10 includes an engine 400 and a digital front end (DFE) 300 for controlling the engine 400. In the present embodiment, the case where the image forming apparatus 10 includes the DFE 300 is described as an example, but the present disclosure is not limited this, and the DFE 300 may be a device separated from the image forming apparatus 10. That is, the DFE 300 is not indispensable to the image forming apparatus 10.

The DFE 300 includes a print controller 310 and a calibration controller 320. The print controller 310 includes an interface (I/F) 311, a rasterization unit 312, a correction curve generator 313, a correction unit 314, and a correction curve memory 315. The I/F 311, the rasterization unit 312, the correction curve generator 313, and the correction unit 314 may be implemented, for example, by central processing unit (CPU) installed software, hardware such as an integrated circuit (IC), or both in combination. The correction curve memory 315 can be implemented by, for example, a hard disk drive (HDD) or the like.

The calibration controller 320 includes an I/F 321, an image density conversion data memory 322, a determiner 323, a second image density converter 324, an acquisition unit 325, a first image density converter 326, an image density conversion data generator 327. The I/F 321, the second image density converter 324, the acquisition unit 325, the first image density converter 326, the image density conversion data generator 327 may be implemented, for example, by CPU installed software, hardware such as an IC, or both in combination. The image density conversion data memory 322 can be implemented by, for example, an HDD, or the like.

The engine 400 includes an image forming section 410, a sensor controller 420, an in-line sensor 430 (an example of a reading unit), a color converter 440, and an I/F 450. The sensor controller 420, the color converter 440, and I/F 450 may be implemented, for example, by CPU installed software, hardware such as an IC, or both in combination.

Figure 2:
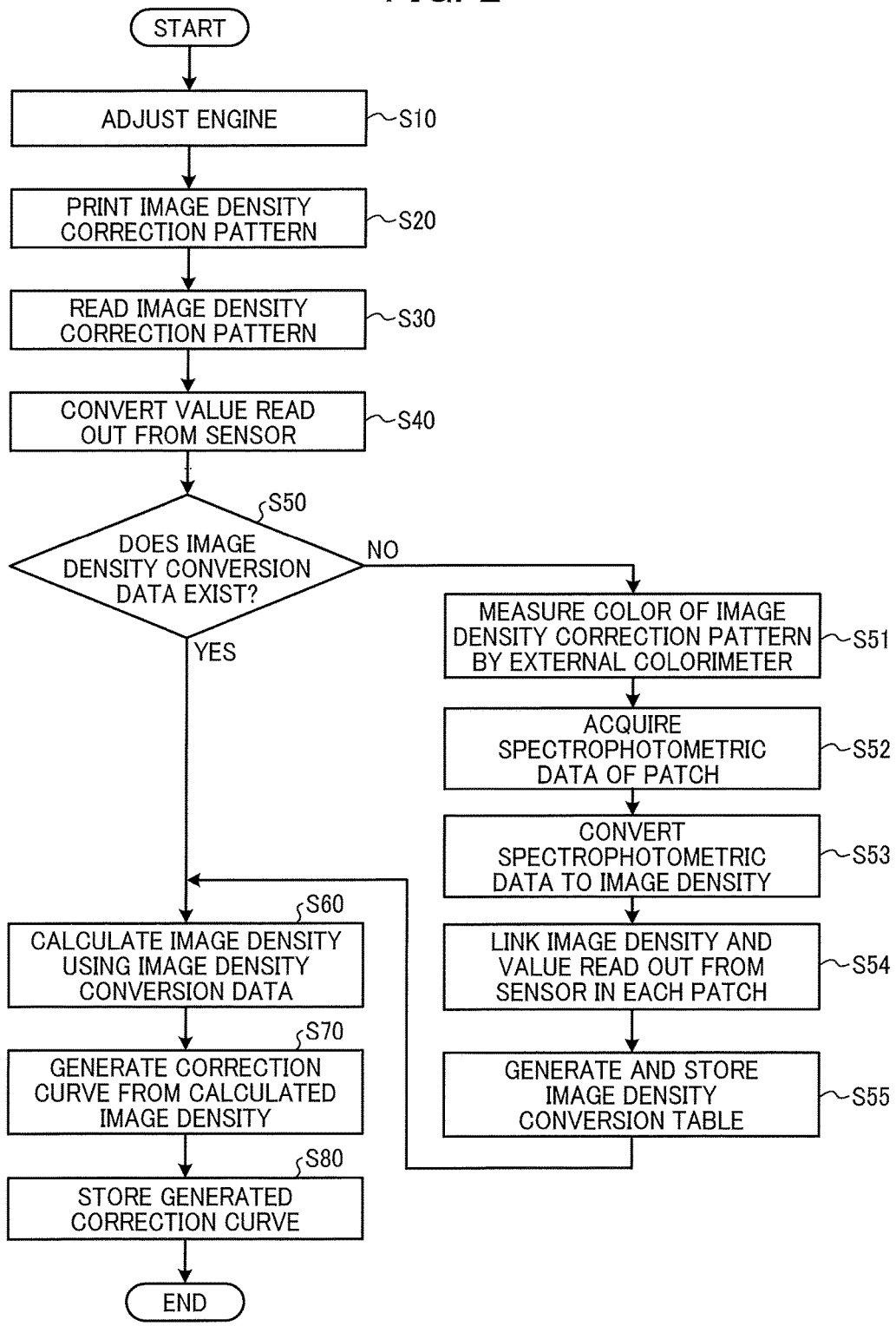
FIG. 2 is a flowchart illustrating an example of automatic calibration processing performed in the image forming system of the present embodiment.

FIG. 2 is a flowchart illustrating an example of automatic calibration processing performed in the image forming system 1 of the present embodiment.

Firstly, the engine 400 performs an engine adjustment to set the engine 400 to an optimum state (step S10). Specifically, the engine adjustment sets the engine 400 to obtain the maximum image density, which stabilizes a gradation of an image output from the image forming apparatus 10 and reduces a gradation difference for each printing.

Subsequently, the image forming section 410 of the engine 400 forms and prints the image density correction pattern 500 on the recording medium (step S20). Specifically, the image forming section 410 irradiates a photoconductor with a light beam from an exposure device, forms a toner image corresponding to each toner on the photoconductor, and transfers the toner image onto a recording medium, thereby forming the image density correction pattern 500.

The image density correction pattern 500, for example, is a pattern in which patches of a plurality of colors (for example, patches of cyan, magenta, yellow, and black) are arranged, but is not limited to this. The recording medium is, for example, a recording paper, but is not limited to this, and may be an image recordable medium such as coated paper, a cardboard, an overhead projector (OHP) sheet, a plastic film, prepreg, a copper foil.

Subsequently, the in-line sensor 430 of the engine 400 reads the image density correction pattern 500 (that is, color of each patch) formed on the recording medium under control of the sensor controller 420, and generates first color data (step S30). In the present embodiment, the first color data is color data in RGB color space (that is, data of red, green, and blue, hereinafter called as RGB data), but this is an example, and the present disclosure is not limited to this.

After the in-line sensor 430 reads the image density correction pattern 500 formed on the recording medium, the fixing device fixes the image density correction pattern 500 on the recording medium by pressurization and heating at a temperature within a predetermined range, and the recording medium with the image density correction pattern 500 is discharged outside the image forming apparatus.

Figure 3:
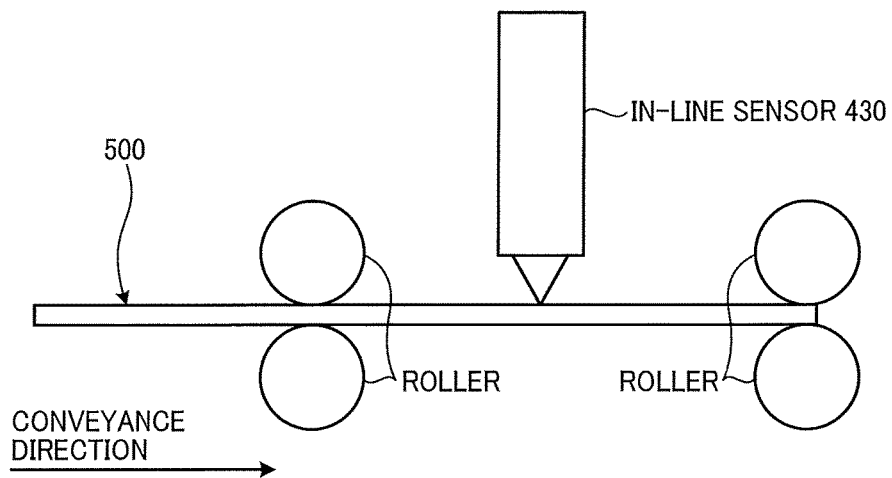
FIG. 3 is a schematic diagram illustrating an example of a configuration of reading an image density correction pattern by an in-line sensor of the present embodiment.
Figure 4:
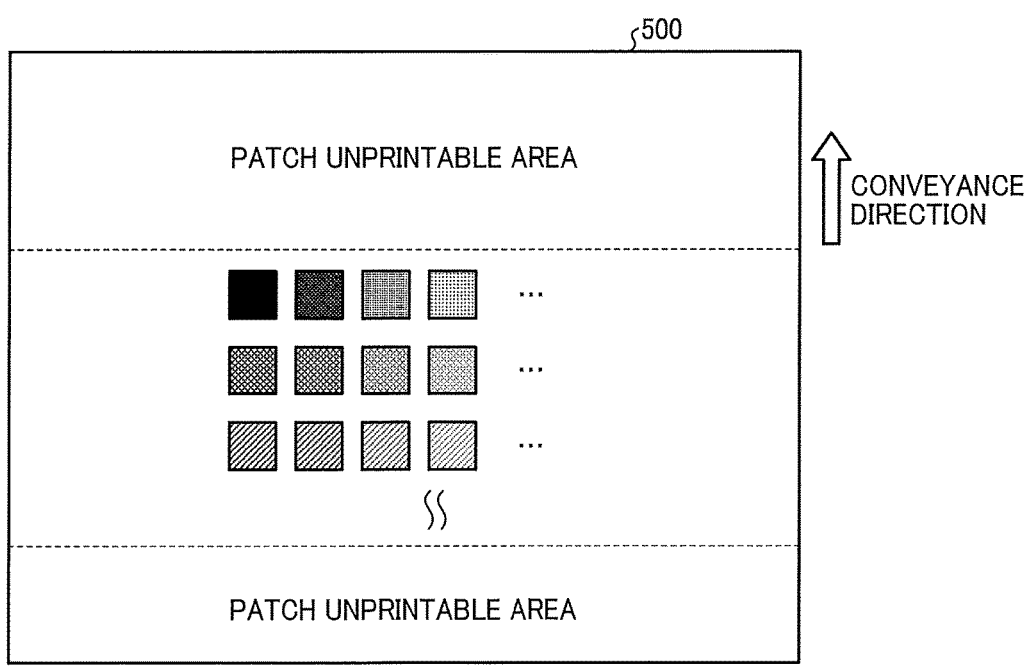
FIG. 4 is a schematic diagram illustrating an example of arrangement of patches constituting the image density correction pattern of the present embodiment.

FIG. 3 is a schematic diagram illustrating an example of a configuration of reading an image density correction pattern 500 by an in-line sensor 430 of the present embodiment and FIG. 4 is a schematic diagram illustrating an example of arrangement of patches constituting the image density correction pattern 500 of the present embodiment.

As illustrated in FIG. 3, to read the image density correction pattern 500 with high accuracy on the conveyed recording medium, the in-line sensor 430 reads the image density correction pattern 500 on the conveyed recording medium in a stable state of being vertically sandwiched between two pairs of rollers disposed upstream and downstream in a conveyance direction of the recording medium. When the in-line sensor 430 reads the image density correction pattern 500 on the recording medium in an unstable state, reading values of the in-line sensor 430 fluctuate, which does not give a stable result.

Therefore, as illustrated in FIG. 4, areas before and after the image density correction pattern 500 on the recording medium in the conveyance direction of the recording medium become patch unprintable areas where placement of the patch is inhibited because the two pairs of rollers disposed upstream and downstream in the conveyance direction of the recording medium do not vertically sandwich the recording medium and the in-line sensor 430 cannot read the image density correction pattern 500 in the stable state.

Figure 5:
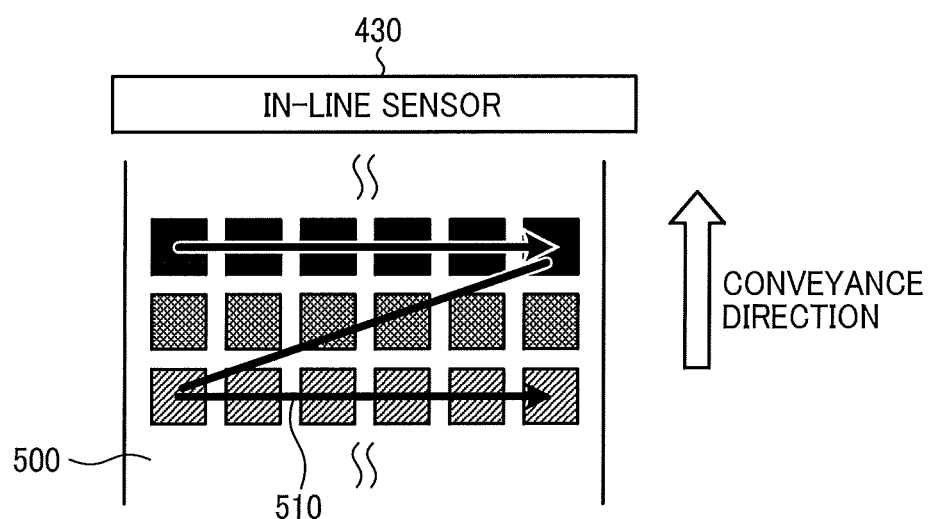
FIG. 5 is a schematic diagram illustrating an example of a reading order of each patch constituting the image density correction pattern by the in-line sensor of the present embodiment.

FIG. 5 is a schematic diagram illustrating an example of a reading order of each patch constituting the image density correction pattern 500 in which the in-line sensor 430 of the present embodiment reads. As illustrated in FIG. 5, the in-line sensor 430 reads each patch constituting the image density correction pattern 500 in the order of the arrow 510 that is the order from left to right with respect to the conveyance direction of the recording medium and from the top to the bottom. This reading order is the same order as the measurement order when the user manually measures the colorimetric value of the image density correction pattern 500 using the external colorimeter 200.

Figure 6:
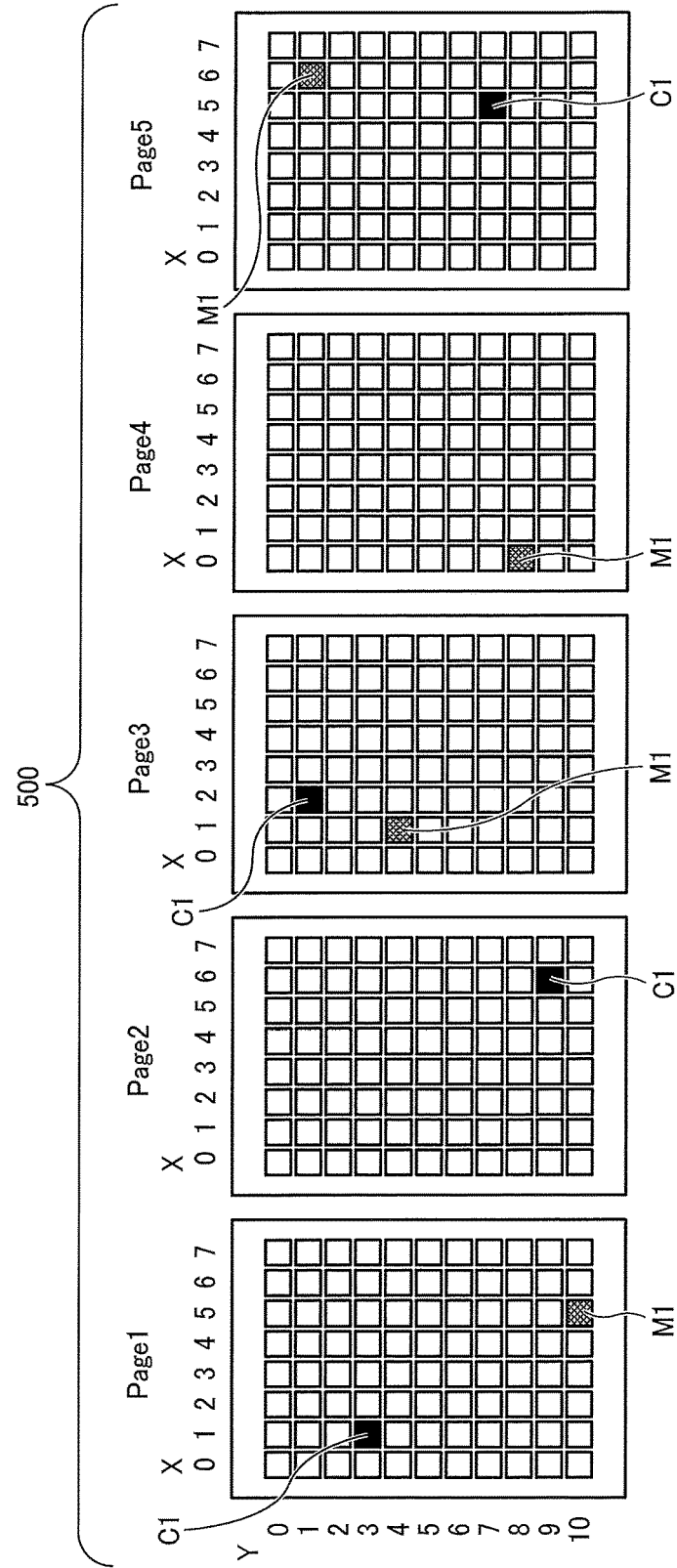
FIG. 6 is an explanatory diagram illustrating an example of an arrangement of patches constituting the image density correction pattern.

FIG. 6 is an explanatory diagram illustrating an example of an arrangement of patches constituting the image density correction pattern 500. In this arrangement, patches having a same color and a same gradation are arranged in a plurality of pages. The image density correction pattern 500 in the present embodiment has the plurality of pages. In the example illustrated in FIG. 6, cyan patches C1 and magenta patches M1 are arranged in each page of the image density correction pattern 500. As illustrated in FIG. 6, in the present embodiment, a random arrangement of patches having the same color and the same gradation in the plurality of pages enables a calibration in which color fluctuation in the main scanning direction and the sub-scanning direction in the engine 400 is cancelled.

Figure 7:
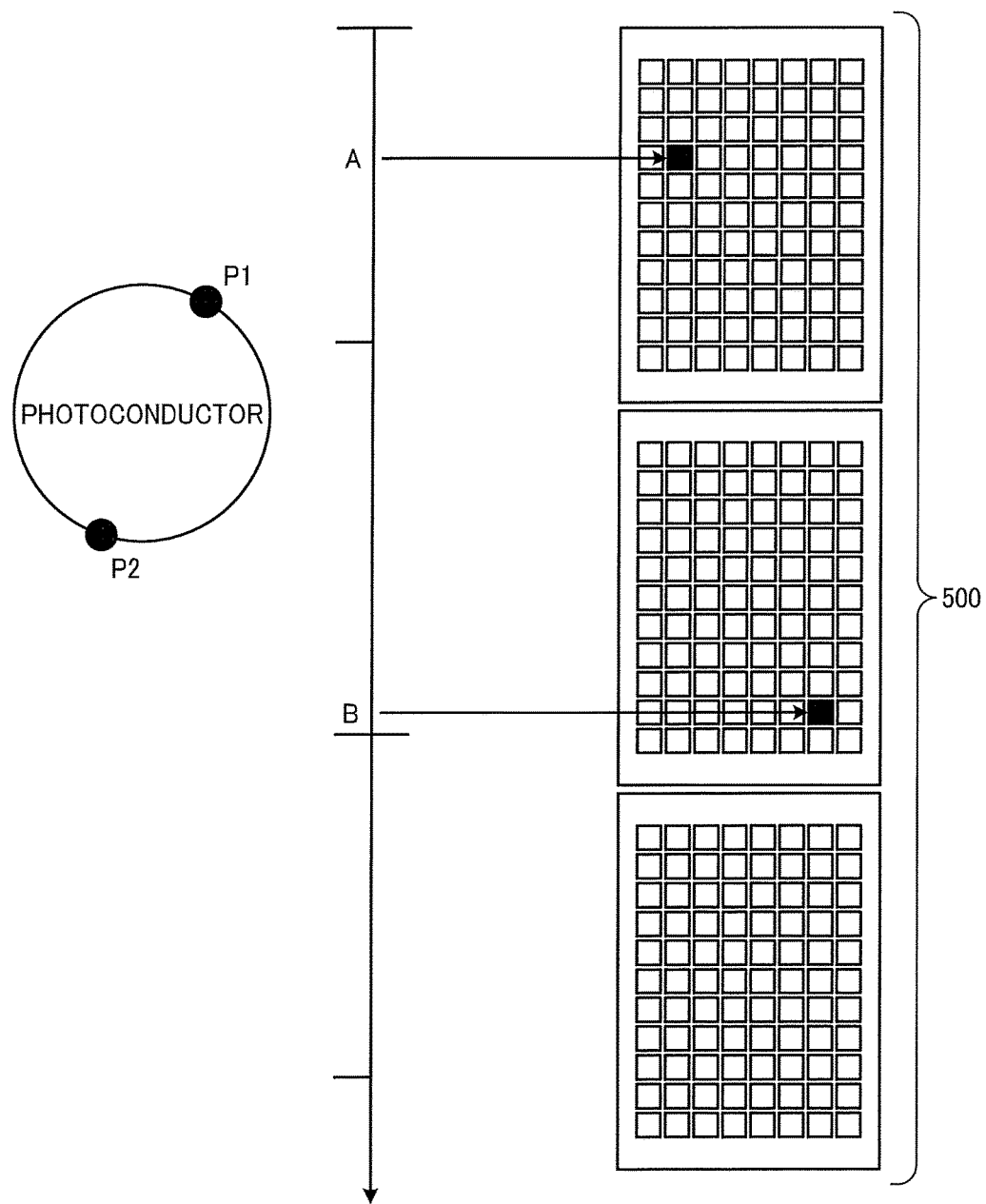
FIG. 7 is an explanatory diagram illustrating an example of an arrangement of patches constituting an image density correction pattern.

FIG. 7 is an explanatory diagram illustrating an example of an arrangement of patches constituting the image density correction pattern 500. In the arrangement of FIG. 7, patches having a same color and a same gradation are distributed on the photoconductor in the sub-scanning direction to cancel the color fluctuation in a photoconductor period. The distribution of the patches having the same color and the same gradation in the sub-scanning direction does not mean a distribution in the sub-scanning direction in each page, but means the distribution on the photoconductor in the sub-scanning direction as illustrated in FIG. 7.

For example, as illustrated in FIG. 7, when a certain patch is arranged at a point P1 on the photoconductor, another patch of the same color and the same gradation as the certain patch is located at a point P2 which is farthest and opposite from the point P1. In this way, patches arranged at intervals in the sub-scanning direction of a submultiple circumferential length of the photoconductor generate image density values corresponding to the color fluctuation in the photoconductor period. Therefore, the average of these image density values cancels the color fluctuation in the photoconductor period.

Referring back to FIG. 2, the color converter 440 converts the first color data generated by the in-line sensor 430 that is reading values of the in-line sensor 430 into second color data (step S40). In the present embodiment, the second color data is color data in RGBY color space (that is, data of red, green, blue, and yellow, hereinafter called as RGBY data 411), but this is an example, and the present disclosure is not limited to this.

Figure 8:
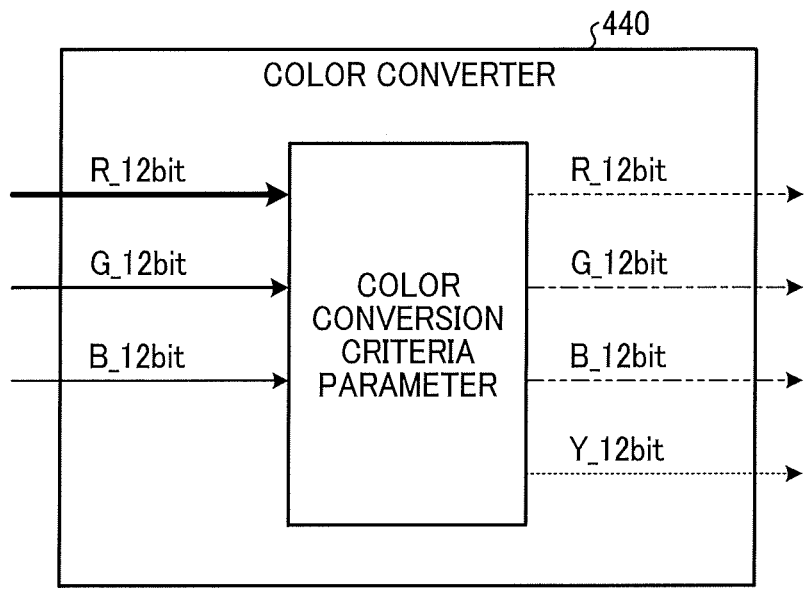
FIG. 8 is an explanatory diagram illustrating an example of a color conversion method of a color converter according to the present embodiment.

FIG. 8 is an explanatory diagram illustrating an example of a color conversion method of the color converter 440 according to the present embodiment. As illustrated in FIG. 8, the color converter 440 converts the RGB data as the first color data into the RGBY data 411 as the second color data using a color conversion criterial parameter that is a look up table (LUT) created using the reference paper. Therefore, the RGBY data 411 is sRGB data for the reference paper.

Because this color conversion enables the engine 400 to cancel device characteristics of the in-line sensor 430 that are individual differences of the in-line sensor 430, there is no need to consider and cancel the device characteristics of the in-line sensor 430 that is individual difference of the in-line sensor 430 in the DFE 300. The reason why the color converter 440 uses the LUT created using the reference paper is that the engine 400 does not generally have enough memory capacity to have the LUT for converting the RGB data into the RGBY data for each recording medium.

The engine 400 transmits the RGBY data 411, which is the second color data converted by the color converter 440, from the I/F 450 to the I/F 321 of the DFE 300.

The image density conversion data memory 322 stores image density conversion data. The image density conversion data is an LUT for converting the RGBY data 411, which is the second color data transmitted from the engine 400, into image density data. In the present embodiment, the image density data is data of cyan, magenta, yellow, and black (hereinafter called as CMYK data), but this is an example, and the present disclosure is not limited to this.

Figure 9:
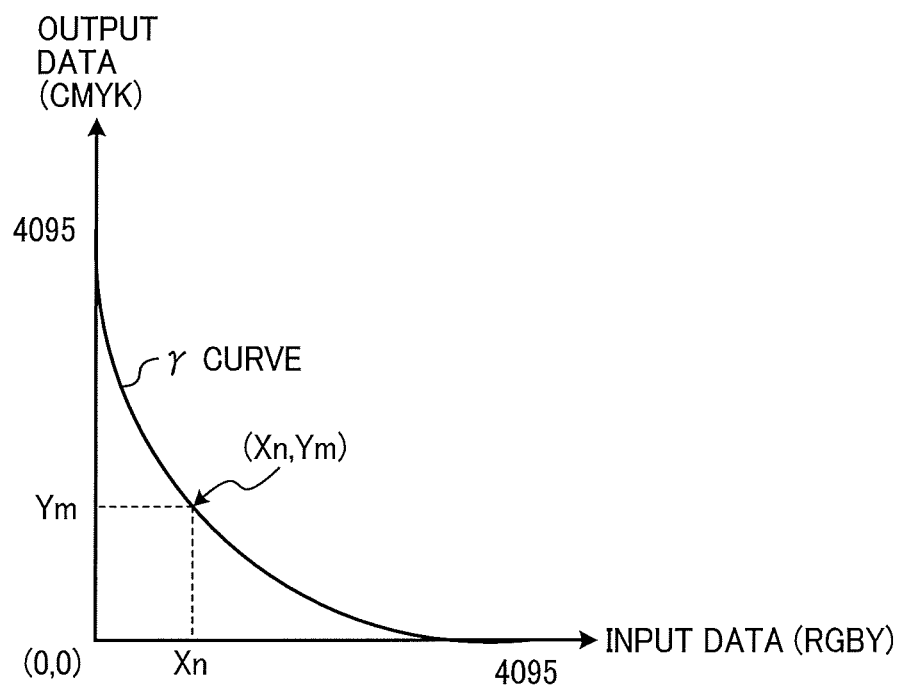
FIG. 9 is a diagram illustrating an example of image density conversion data according to the present embodiment.

FIG. 9 is a graph illustrating an example of image density conversion data according to the present embodiment. The image density conversion data is a one-dimensional LUT to convert the input RGBY data 411 into CMYK data according to the γ curve illustrated in FIG. 9. Specifically, using CMYK data of 4096 gradations set in the γ curve that is γ table as the image density conversion data converts the inputted RGBY data 411 into corresponding CMYK data.

Figure 10:
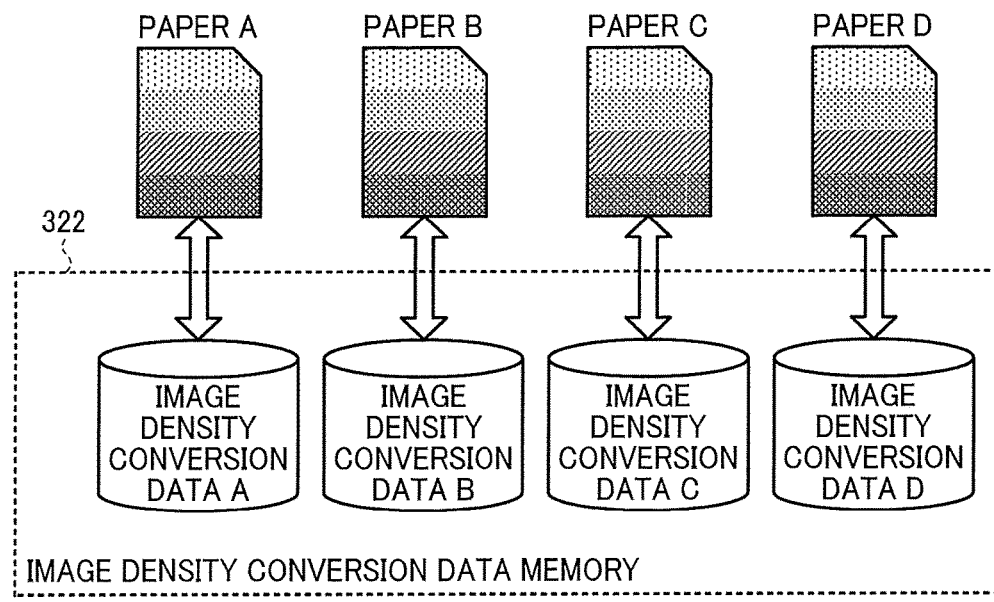
FIG. 10 is a diagram illustrating an example of image density conversion data according to the present embodiment.

As illustrated in FIG. 10, the image density conversion data memory 322 stores the image density conversion data as the LUT for multiple types of the recording medium. In the example illustrated in FIG. 10, the image density conversion data memory 322 stores the image density conversion data A for paper A, the image density conversion data B for paper B, the image density conversion data C for paper C, and the image density conversion data for paper D.

Referring back to FIG. 2, the determiner 323 determines whether the image density conversion data memory 322 contains the image density conversion data for the type of the recording medium on which the image density correction pattern is formed (step S50).

When the image density conversion data memory 322 contains the image density conversion data for the type of the recording medium on which the image density correction pattern is formed (Yes in step S50), the second image density converter 324 converts the second color data into image density data using the stored image density conversion data. In other words, the second image density converter 324 calculates the image density data based on the second color data.

Figure 11:
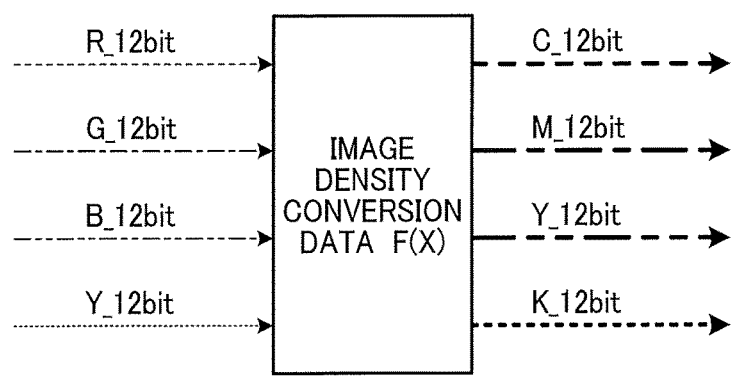
FIG. 11 is an explanatory diagram illustrating an example of an image density conversion method of a second image density converter according to the present embodiment.

FIG. 11 is an explanatory diagram illustrating an example of an image density conversion method of the second image density converter 324 according to the present embodiment. As illustrated in FIG. 11, the second image density converter 324 uses the image density conversion data (one-dimensional LUT) of the type of the recording medium on which the image density correction pattern is formed to convert the RGBY data 411 as the second color data into CMYK data that is the image density data. Since the image density conversion data is the one-dimensional LUT and the RGBY data 411 has 12 bits for each color, CMYK data also has 12 bits for each color.

Referring back to FIG. 2, the correction curve generator 313 generates correction curve data based on the image density data converted by the second image density converter 324 (step S70) and stores the correction curve data in the correction curve memory 315 (step S80).

On the other hand, when the image density conversion data memory 322 does not contain the image density conversion data for the type of the recording medium on which the image density correction pattern is formed (No in step S50), the user uses the external colorimeter 200 and manually measures the colorimetric value of the image density correction pattern 500 (step S51). In this case, a measurement order of the patches constituting the image density correction pattern 500 is the same as the reading order by the in-line sensor 430.

Subsequently, the acquisition unit 325 acquires spectral data that is a colorimetric result of the image density correction pattern 500 measured by the external colorimeter 200 (step S 52). Specifically, since spectroscopic data that is a colorimetric result of the image density correction pattern 500 is transmitted from the external colorimeter 200 to the PC 100, the acquisition unit 325 acquires the spectroscopic data from the PC 100 via the LAN 2 and the I/F 321.

Subsequently, the first image density converter 326 converts the spectral data acquired by the acquisition unit 325 into image density data (step S53).

Next, the image density conversion data generator 327 correlates the RGBY data 411 as the second color data transmitted from the engine 400 and the CMYK data as the image density data converted from the spectral data for each patch (step S54), generates the image density conversion data for the type of the recording medium on which the image density correction pattern 500 is formed, stores and registers the generated image density conversion data in the image density conversion data memory 322. In the present embodiment, since the plurality of patches of the same color and the same gradation are arranged in the image density correction pattern 500, the image density conversion data generator 327 uses an average of values of the patches of the same color and the same gradation.

FIG. 12 is a table illustrating an example of an outlined correspondence between RGBY data and CMYK data in the image density conversion data according to the present embodiment, and FIGS. 13A to 13H (collectively referred to as FIG. 13) are divisions of a table illustrating an example of a detailed correspondence between RGBY data and CMYK data in the image density conversion data according to the present embodiment.

As illustrated in FIG. 12, the image density conversion data corresponds to each version. The order of arrangement of reading values and colorimetric values in patches differs between RGBY data and CMYK data. Therefore, as illustrated in FIG. 13, the image density conversion data generator 327 performs sort processing in the order of the gradation values of the patches for each of cyan, magenta, yellow, and black with the patch coordinate data as the patch position on the image density correction pattern 500 as a reference, RGBY data 411 and CMYK data are associated with each other for each patch to generate the image density conversion data.

Figure 14:
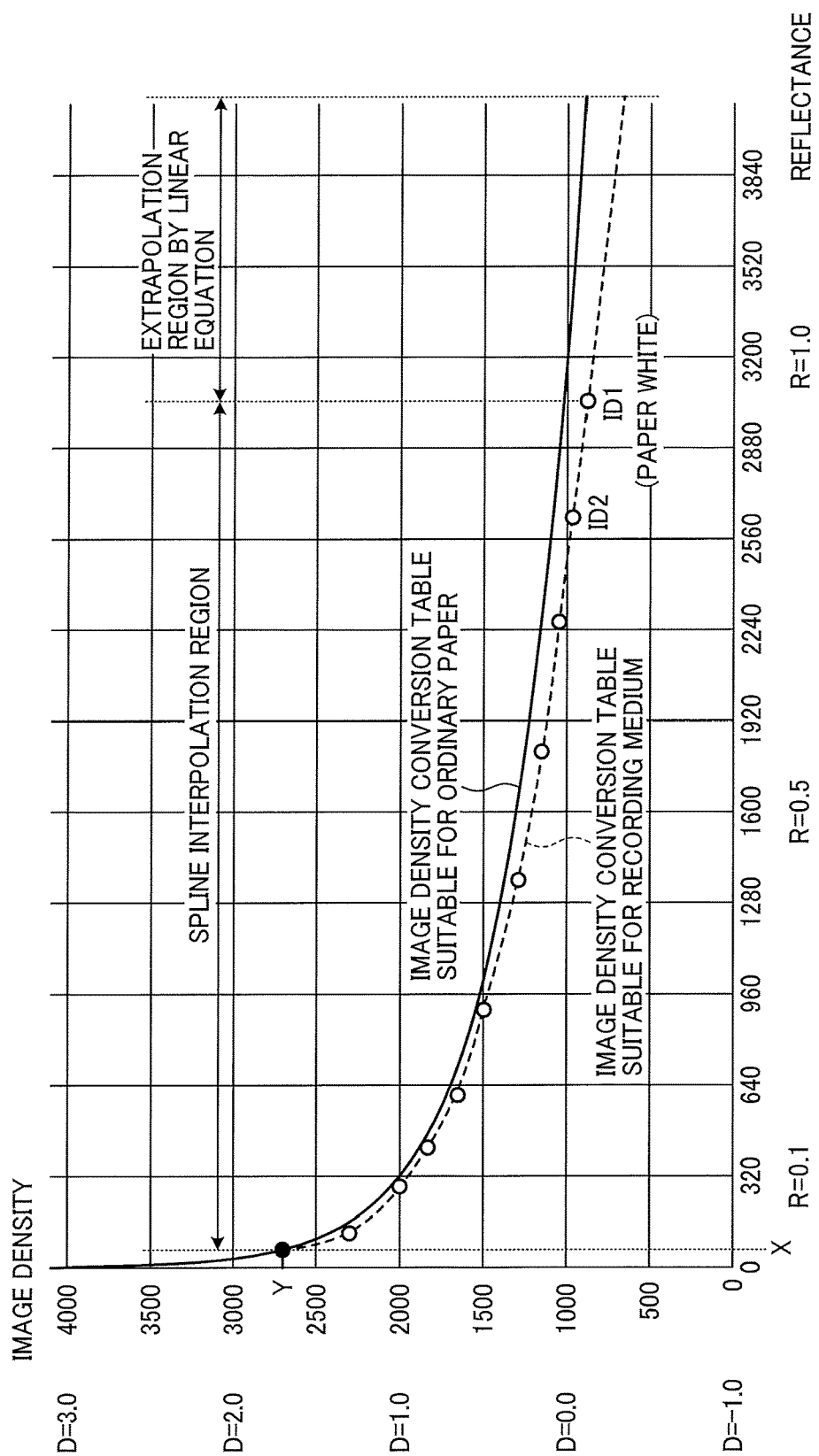
FIG. 14 is a graph for illustrating a detailed example of a process of generating image density conversion data according to the present embodiment.

FIG. 14 is a graph for illustrating a detailed example of a process of generating image density conversion data according to the present embodiment. As described with reference to FIG. 13, the image density conversion data generator 327 performs the sort processing in the order of the gradation values of the patches for each of cyan, magenta, yellow, and black, correlates the RGBY data 411 and the CMYK data, and generates the image density conversion data by spline interpolation from paper white to a spline interpolation execution density that corresponds to paper. The image density conversion data generator 327 also performs spline interpolation on the set values between the maximum image density of each CMYK data and the spline interpolation execution density that corresponds to the paper. A default value may be set by evaluating the variation of the engine characteristics of the actual machine and the reading value of the in-line sensor 430 and deciding the optimum value for each model. When the read value of the patch of the image density correction pattern 500 is smaller than the spline interpolation execution density that corresponds to the paper, the image density conversion data generator 327 does not execute the spline interpolation but executes linear interpolation using a patch image density that is the highest value in a range of equal to or less than the spline interpolation execution density that corresponds to the paper. Specifically, the image density conversion data generator 327 calculates a linear equation that expresses a line from paper white to highlight color and, by extrapolation, set the table setting value for a range lighter than the paper white. Consequently, the image density conversion data is generated.

Referring back to FIG. 2, after the image density conversion data is generated, the process proceeds to step S60, and the second image density converter 324 converts the second color data into the image density data using the image density conversion data.

Next, an example of a printing process procedure performed by the image forming system 1 of the present embodiment is described.

First, the DFE 300 receives print data including image data of an image to be printed from the PC 100 via the I/F 311.

Subsequently, the rasterization unit 312 performs a rasterization process on the image data of the image to be printed based on the received print data.

Subsequently, the correction unit 314 acquires, from the correction curve memory 315, the correction curve data for the recording medium on which the engine 400 forms the image, and corrects the gradation of the image of the image data performed the rasterization process by the rasterization unit 312 based on the acquired correction curve data.

Subsequently, the DFE 300 sends the image data on which the correction unit 314 corrects the gradation of the image to the engine 400, and the image forming section 410 forms and prints the image data on the recording medium.

Since the image forming apparatus according to the present embodiment described above generates the image density conversion data for the recording medium on which the image density conversion data is not prepared and generates correction curve data using the generated image density conversion data, a suitable calibration can be performed for printing on various kinds of recording media.

First Modification

In the above embodiment, one in-line sensor 430 is used, but two or more in-line sensors 430 may be used. For example, inexpensive in-line sensors 430-1 and 430-2 may be connected in series for use to reduce costs.

Figure 15:
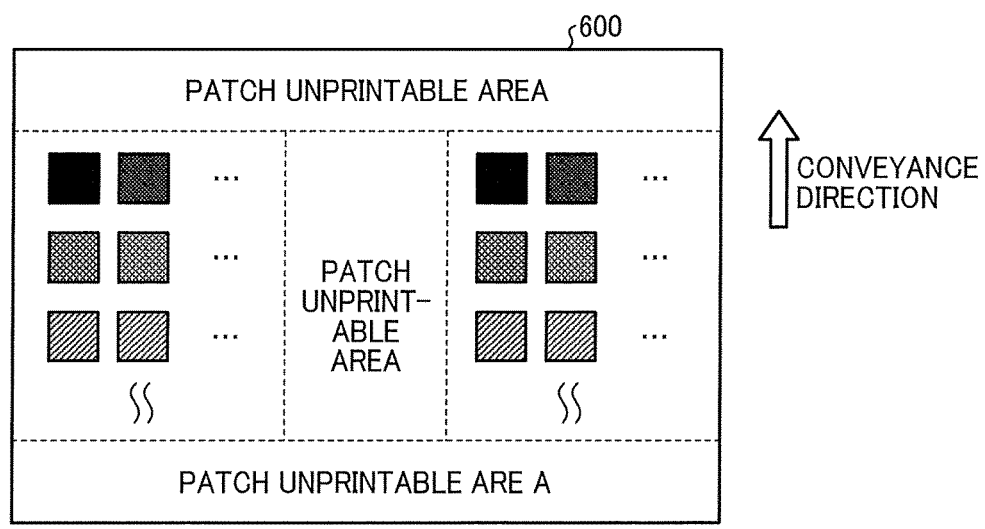
FIG. 15 is a schematic diagram illustrating an example of arrangement of patches constituting the image density correction pattern of the first modification.

FIG. 15 is a schematic diagram illustrating an example of arrangement of patches constituting the image density correction pattern 600 of the first modification. The in-line sensors 430-1 and 430-2 connected in series cannot read the image density correction pattern 600 at the center portion that is a joint between the in-line sensors 430-1 and 430-2. Therefore, as illustrated in FIG. 15, in addition to the areas before and after the image density correction pattern 500 on the recording medium in the conveyance direction of the recording medium, a central area also becomes the patch unprintable area where the placement of the patch is inhibited.

Figure 16:
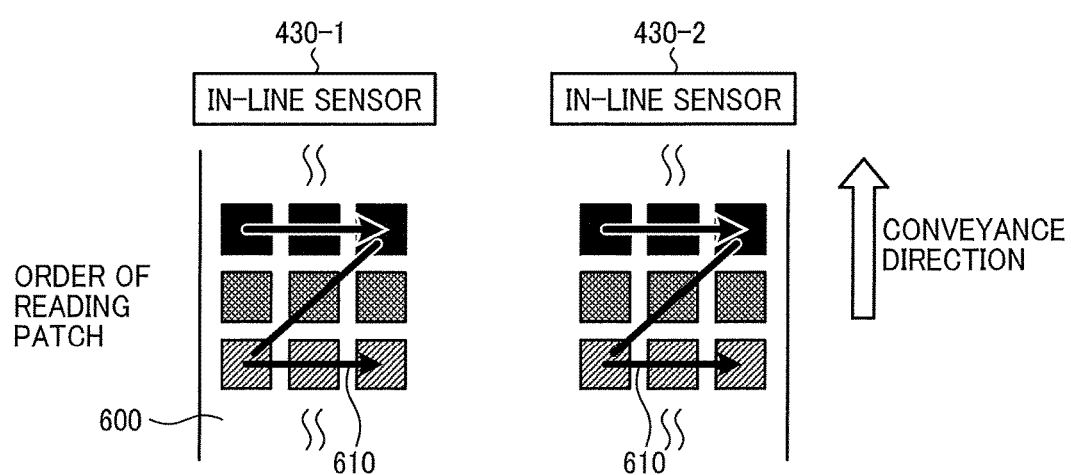
FIG. 16 is a schematic diagram illustrating an example of a reading order of each patch constituting the image density correction pattern by the in-line sensor of the first modification.

FIG. 16 is a schematic diagram illustrating an example of a reading order of each patch constituting the image density correction pattern 600 by the in-line sensors 430-1 and 430-2 of the first modification. As illustrated in FIG. 16, the in-line sensors 430-1 and 430-2 read each patch constituting the image density correction pattern 600 in the order of the arrow 610 that is the order from left to right with respect to the conveyance direction of the recording medium and from the top to the bottom. This reading order is the same as the reading order in the case of one in-line sensor 430 described in the above embodiment, but different from the measurement order when the user manually measures the colorimetric value of the image density correction pattern 600 using the external colorimeter 200.

Figure 17:
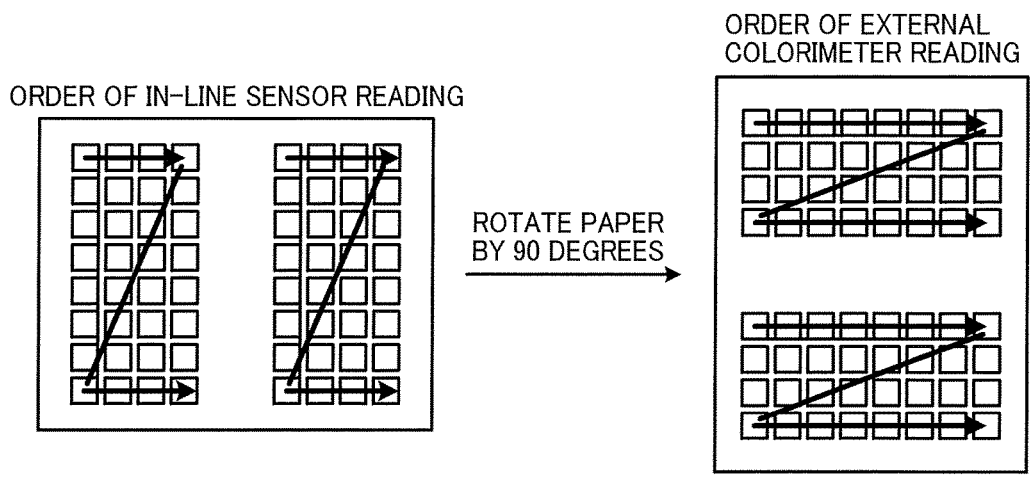
FIG. 17 is an explanatory diagram illustrating a difference between the reading order of each patch constituting the image density correction pattern by the in-line sensor of the first modification and a colorimetric order of each patch constituting the image density correction pattern by the external colorimeter.

FIG. 17 is an explanatory diagram illustrating a difference between the reading order of each patch constituting the image density correction pattern 600 by the in-line sensors 430-1 and 430-2 of the first modification and a colorimetric order of each patch constituting the image density correction pattern 600 by the external colorimeter 200.

The reading order of each patch constituting the image density correction pattern 600 by the in-line sensors 430-1 and 430-2 is as described in FIG. 16. On the other hand, in the colorimetry of each patch constituting the image density correction pattern 600 by the external colorimeter 200, since the user performs colorimetry manually, the same reading order as the reading order by the in-line sensors 430-1, and 430-2 increases person-hours of the colorimetry and the burden on the user.

Therefore, as illustrated in FIG. 17, the colorimetric order of the image density correction pattern 600 in the first modification is the order from the left to the right and from the top to the bottom with image the image density correction pattern 600 rotated by 90°. This order prevents an increase in person-hours of colorimetry and burden on the user.

However, in this first modification, unlike in the above embodiment, since the reading order and the colorimetric order of the image density correction pattern 600 are different, an order of the read values of each patch constituting the image density correction pattern 600 does not correspond to an order of the colorimetric values. Therefore, in the first modification, the read values by in-line sensors 430-1 and 430-2 (that are RGBY data) are sorted by order.

Figure 18:
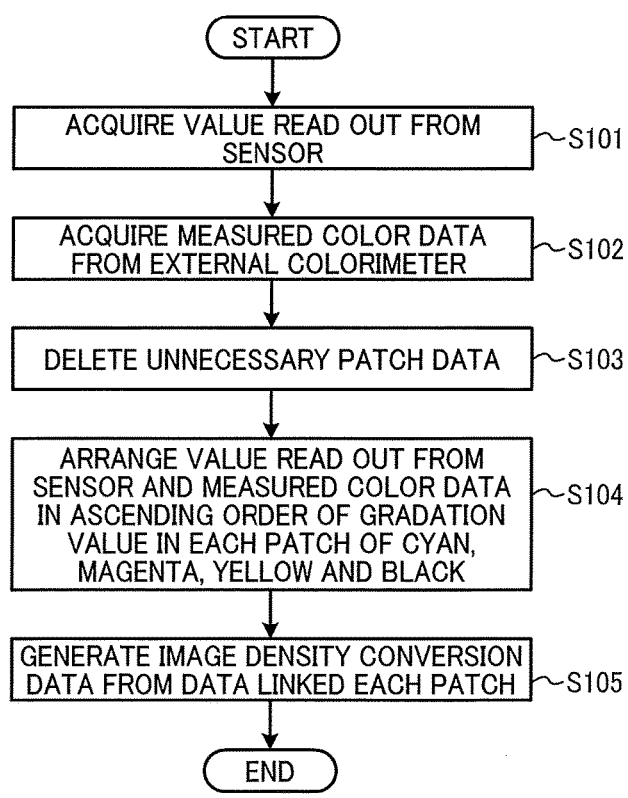
FIG. 18 is a flowchart illustrating an example of a procedure of sorting processing of RGBY data performed in the image forming system 1 of the first modification.

FIG. 18 is a flowchart illustrating an example of a sorting processing of RGBY data performed in the image forming system 1 of the first modification.

First, the image density conversion data generator 327 acquires RGBY data that is the second color data transmitted from the engine 400 (step S101).

Subsequently, the acquisition unit 325 acquires CMYK data as spectral data that is a colorimetric result of the image density correction pattern 600 measured by the external colorimeter 200 (step S102).

Subsequently, the image density conversion data generator 327 deletes unnecessary patch data for sorting from the RGBY data and the CMYK data (step S103).

Subsequently, the image density conversion data generator 327 rearranges the RGBY data and the CMYK data from which unnecessary patch data is deleted so as to have the same arrangement order (step S104). The rearrangement is performed in ascending order of patches for each of cyan magenta, yellow, and black.

Subsequently, the image density conversion data generator 327 correlates the rearranged RGBY data and the rearranged CMYK data in each patch, and generates the image density conversion data (step S105).

Second Modification

The patches in the image density correction pattern 600 may be arranged to reduce the person-hours of colorimetry in which the user manually performs using the external colorimeter 200.

Figure 19:
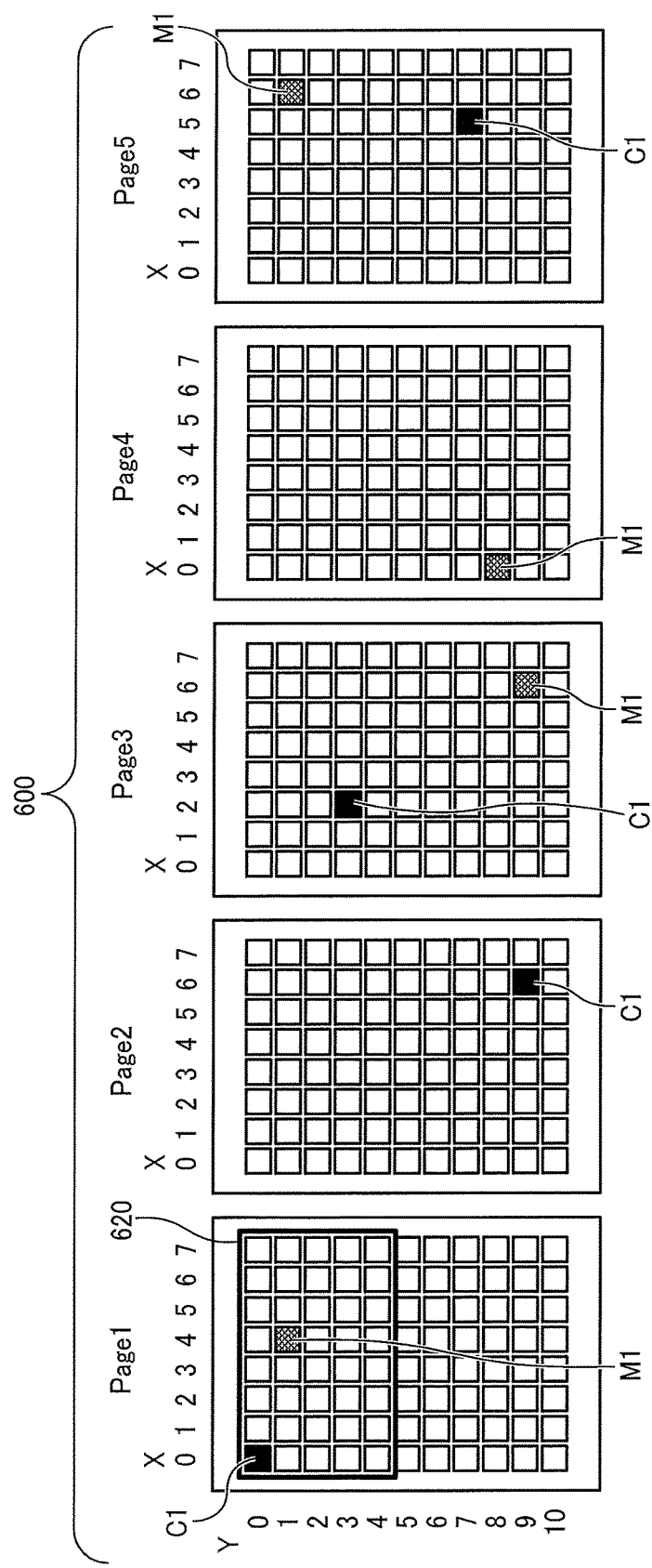
FIG. 19 is an explanatory diagram illustrating an example of an arrangement of patches constituting the image density correction pattern of the second modification.

FIG. 19 is an explanatory diagram illustrating an example of an arrangement of patches constituting an image density correction pattern of the second modification. In the colorimetry of each patch constituting the image density correction pattern 600 by the external colorimeter 200, the colorimetric data in one measurement may be treated as a true value. Therefore, as illustrated in FIG. 19, the image density correction pattern 600 in the second modification collectively includes the patches necessary for the manual measurement in the first page (specifically, the area 620 in the first page). This patch arrangement reduces person-hours for colorimetry because the user does not need to perform colorimetry in all pages when the user performs colorimetry of each patch constituting the image density correction pattern 600 using the external colorimeter 200.

The image forming apparatus in the second modification may have a mode of measuring only a part of the image density correction pattern 600 and a mode of measuring all pages of the image density correction pattern 600 for the user to select the mode.

Third Modification

In the above embodiment, the image density correction data may be prepared and generated not only for the type of the recording medium but also for each type and size of the recording medium.

Program

A computer program executed in the image forming apparatus of the embodiment and the modifications described above is recorded and provided, as a file whose format is installable or executable, in a computer-readable storage medium such as a compact disk read-only memory (CD-ROM), a compact disk recordable (CD-R), a memory card, a digital versatile disk (DVD), and a flexible disk (FD).

The program executed in the image forming apparatus of at least of the embodiment and modifications may be stored on a computer connected to a network such as the Internet or the like, and may be downloaded and provided through the network. The program executed in the image forming apparatus of at least of the embodiment and modifications may be provided or distributed via a network such as the Internet. The program executed in the image forming apparatus of the embodiment and the modifications may be preliminarily embedded in a read only memory (ROM) and the like, and then provided.

The program executed by the image forming apparatus of the above embodiment or modifications has a module structure such that the above units are realized on a computer. As actual hardware, for example, the CPU reads the program from the ROM to the RAM and executes it, so that each functional unit is realized on the computer.

Numerous additional modifications and variations are possible in light of the above teachings. It is therefore to be understood that, within the scope of the above teachings, the present disclosure may be practiced otherwise than as specifically described herein. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus comprising:
   an image forming section to form an image density correction pattern on a recording medium;
   a reading unit to read the image density correction pattern formed on the recording medium and generate first color data;
   a color converter to convert the first color data into second color data;

an image density conversion data memory to store image density conversion data for multiple types of the recording medium;
a determiner to determine whether the image density conversion data memory contains the image density conversion data for a type of the recording medium on which the image density correction pattern is formed;
an acquisition unit to acquire spectral data that is a colorimetric result of the image density correction pattern measured by an external colorimeter when the determiner determines that the image density conversion data memory does not contain the image density conversion data for the type of the recording medium on which the image density correction pattern is formed;
a first image density converter to convert the spectral data into image density data;
an image density conversion data generator to correlate the second color data and the image density data and generate the image density conversion data for the type of the recording medium on which the image density correction pattern is formed;
a second image density converter to convert the second color data into the image density data using the image density conversion data generated by the image density conversion data generator; and
a correction curve generator to generate correction curve data based on the image density data.

2. The image forming apparatus according to claim 1, wherein, when the image density conversion data memory contains the image density conversion data for the type of the recording medium on which the image density correction pattern is formed, the second image density converter converts the second color data into the image density data using the image density conversion data stored in the image density conversion data memory.

3. The image forming apparatus according to claim 1, further comprising a correction unit to correct a gradation based on the correction curve data.

4. The image forming apparatus according to claim 1, wherein the image density correction pattern includes a plurality of patches, and patches of a same color and a same gradation are arranged over a plurality of pages of the image density correction pattern.

5. The image forming apparatus according to claim 4, wherein an interval in the sub-scanning direction of the patches of the same color and the same gradation is submultiple circumferential length of a photoconductor.

6. The image forming apparatus according to claim 4, wherein patches for colorimetry of the image density correction pattern by the external colorimeter are collectively arranged in a first page of the image density correction pattern.

7. The image forming apparatus according to claim 1, wherein the reading unit includes a plurality of in-line sensors coupled in series, and
wherein no patch is disposed in a center portion of the image density correction pattern.

8. The image forming apparatus according to claim 7, wherein a reading order of the image density correction pattern by the reading unit is different from a colorimetric order of the image density correction pattern by the external colorimeter,
wherein the image density conversion data generator rearranges values constituting at least one of the second color data and the image density data, and correlates the second color data and the image density data.

9. An image forming system comprising:
an image forming section to form an image density correction pattern on a recording medium;
a reading unit to read the image density correction pattern formed on the recording medium and generate first color data;
a color converter to convert the first color data into second color data;
an image density conversion data memory to store image density conversion data for multiple types of the recording medium;
a determiner to determine whether the image density conversion data memory contains the image density conversion data for the type of the recording medium on which the image density correction pattern is formed;
an acquisition unit to acquire spectral data that is a colorimetric result of the image density correction pattern measured by an external colorimeter when the determiner determines that the image density conversion data memory does not contain the image density conversion data for the type of the recording medium on which the image density correction pattern is formed;
a first image density converter to convert the spectral data into image density data;
an image density conversion data generator to correlate the second color data and the image density data and generate the image density conversion data for the type of the recording medium on which the image density correction pattern is formed;
a second image density converter to convert the second color data into the image density data using the image density conversion data generated by the image density conversion data generator; and
a correction curve generator to generate correction curve data based on the image density data.

10. A calibration method comprising:
forming an image density correction pattern on a recording medium;
reading the image density correction pattern formed on the recording medium and generating first color data;
converting the first color data into second color data;
determining whether image density conversion data of a type of the recording medium on which the image density correction pattern is formed is stored in a memory;
acquiring spectral data that is a colorimetric result of the image density correction pattern measured by an external colorimeter, when the image density conversion data for the type of the recording medium on which the image density correction pattern is formed is not stored in the memory;
converting the spectral data into image density data;
correlating the second color data and the image density data;
generating the image density conversion data for the type of the recording medium on which the image density correction pattern is formed;
converting the second color data into the image density data using the generated image density conversion data; and generating correction curve data based on the image density data.

* * * * *